(12) United States Patent
Orioli et al.

(10) Patent No.: US 9,965,877 B2
(45) Date of Patent: May 8, 2018

(54) IMAGE PROCESSING APPARATUS AND ASSOCIATED METHODS

(71) Applicant: Nokia Technologies Oy, Espoo (FI)

(72) Inventors: Cristiano Orioli, Fontanellato (IT); Ari Liusaari, Espoo (FI)

(73) Assignee: Nokia Technologies Oy, Espoo (FI)

( * ) Notice: Subject to any disclaimer, the term of this patent is extended or adjusted under 35 U.S.C. 154(b) by 30 days.

(21) Appl. No.: 13/725,425

(22) Filed: Dec. 21, 2012

(65) Prior Publication Data

US 2014/0176598 A1  Jun. 26, 2014

(51) Int. Cl.
 *G09G 5/00* (2006.01)
 *G06T 11/60* (2006.01)
 *G06F 3/0488* (2013.01)

(52) U.S. Cl.
 CPC .......... *G06T 11/60* (2013.01); *G06F 3/04883* (2013.01); *G06F 2203/04806* (2013.01); *G06F 2203/04808* (2013.01)

(58) Field of Classification Search
 CPC ................................. G06T 11/20; G06T 19/00
 USPC .......................................................... 345/619
 See application file for complete search history.

(56) References Cited

U.S. PATENT DOCUMENTS

| | | | |
|---|---|---|---|
| 7,046,286 B1 | 5/2006 | Kobayashi et al. | |
| 2003/0186708 A1* | 10/2003 | Parulski et al. | ........... 455/456.1 |
| 2007/0229557 A1* | 10/2007 | Okumura et al. | ............ 345/698 |
| 2008/0297587 A1* | 12/2008 | Kurtz | ................. G06K 9/00335 |
| | | | 348/14.08 |
| 2010/0174421 A1* | 7/2010 | Tsai | ...................... G06F 1/1616 |
| | | | 700/302 |

OTHER PUBLICATIONS

K. Iwamoto, K. Komoriya, K. Tanie, "Eye movement tracking type image display system for wide view image presentation with high-resolution—evaluation of high-resolution image presentation", Published in Robot and Human Communication, 1995. RO-MAN'95 Tokyo, Proceedings., 4th IEEE International Workshop on, Jul. 5-7, 1995.*

Jeannette Barnes, "A Beginner's Guide to Using IRAF", Aug. 1993, http://www.astro.pomona.edu/webdocuments/iraf/beg/beg-image.html.*

International Search Report and Written Opinion for Application No. PCT/FI2013/051153 dated May 30, 2014.

* cited by examiner

*Primary Examiner* — Jin Ge
(74) *Attorney, Agent, or Firm* — Alston & Bird LLP

(57) ABSTRACT

An apparatus comprising:
 at least one processor; and
 at least one memory including computer program code,
 the at least one memory and the computer program code configured, with the at least one processor, to cause the apparatus to perform at least the following:
 enable a display of a default image corresponding to a core portion of a larger image, the larger image comprising a core portion and a peripheral portion, and said display of the default image occurring at the time of opening an application or file to display the core image; and
 in response to a user input during the display of the core portion, reveal at least a part of the peripheral portion.

16 Claims, 5 Drawing Sheets

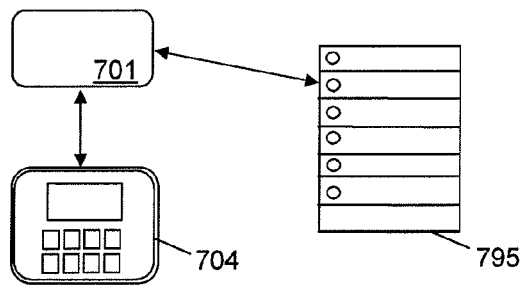

Figure 7b

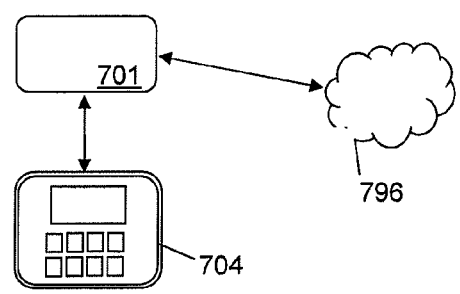

Figure 8

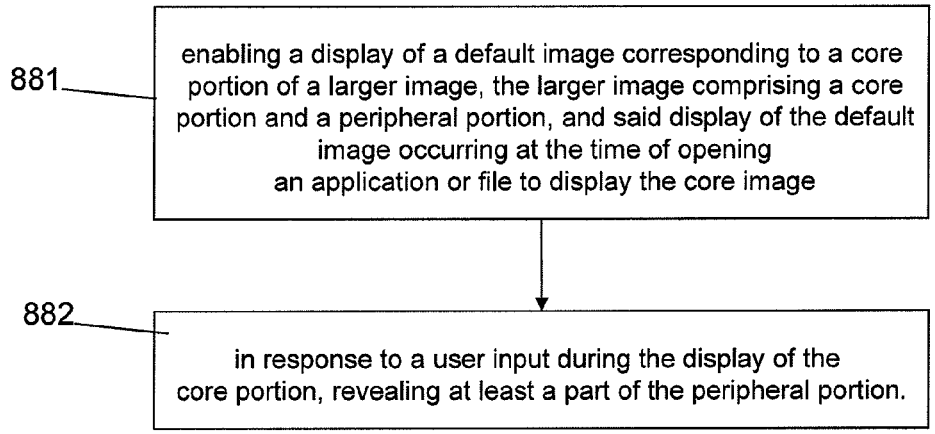

881 — enabling a display of a default image corresponding to a core portion of a larger image, the larger image comprising a core portion and a peripheral portion, and said display of the default image occurring at the time of opening an application or file to display the core image 882 — in response to a user input during the display of the core portion, revealing at least a part of the peripheral portion.

Figure 9

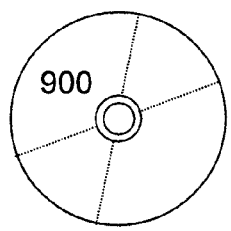

IMAGE PROCESSING APPARATUS AND ASSOCIATED METHODS

TECHNICAL FIELD

The present disclosure relates to the field of image processing, associated methods and apparatus. Certain disclosed example aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs) and tablet PCs.

The portable electronic devices/apparatus according to one or more disclosed example aspects/embodiments may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

It is common for electronic devices to allow the user to process and control different types of data, such as image data. For example, electronic device may be used to generate, store, display, and/or edit image data.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect there is provided an apparatus comprising an apparatus comprising:
  at least one processor; and
  at least one memory including computer program code,
  the at least one memory and the computer program code configured, with the at least one processor, to cause the apparatus to perform at least the following:
  enable a display of a default image corresponding to a core portion of a larger image, the larger image comprising a core portion and a peripheral portion, and said display of the default image occurring at the time of opening an application or file to display the core image; and
  in response to a user input during the display of the core portion, reveal at least a part of the peripheral portion.
The user input may comprise at least one of:
  zoom out input; and
  scroll input.
An input may comprise a single-touch or multi-touch gesture. The input, of course, may or may not be touch input. For example the user input could be input using a mouse, a touchpad, or other separate and/or external input device, for example.

The larger image may be between about 5% and about 20% larger in at least one dimension than the core image.

The core image may be the central portion of the larger image (e.g. central with respect to one or more axes). The larger image may be larger with respect to the core image. The larger image may be considered to be a complete image.

An image may be a still image or a video image (which may, in any case, be made up of a plurality of still images).

The data corresponding to the core image may be demarked from data corresponding to the peripheral image.

The core image data may be demarked from the peripheral image data by one or more respective flags configured to denote at least one of: the core image data as core image data; and peripheral image data as peripheral image data.

One or more of the core image data and peripheral image data may be respectively demarked to allow the core image data to be stored in a separate file from the peripheral image data to allow for subsequent recombination into the image data by using the respective demarking.

The demarcation may be performed by the application at the time of opening the application or file to display the core image.

The larger image may correspond to a captured scene (e.g. a photograph). The image data image may be photographic data.

The core image may correspond to a portion of the captured scene, the portion being displayed within an image capture viewfinder when the image was captured.

The peripheral image may correspond to a portion of the captured scene around at least part of the perimeter of the portion of the captured scene represented by the core image data. The perimeter portion may not be displayed within the image capture viewfinder when the image was captured.

That is, the image that is captured may be broader (one or more of length/width/radius) than the image which is seen through the viewfinder when the image was captured. For example, if the image as seen through the viewfinder corresponds to a 35 mm lens, the image data which is captured may correspond to a 28 mm lens (a 28 mm lens capturing a larger image than a 35 mm lens). In other embodiments, the viewfinder may be configured to display the image corresponding to a core portion of the image sensor. The image sensor may be a CCD sensor, an active-pixel sensor or a CMOS sensor.

The apparatus may comprise a display to display the images to a user.

According to a further aspect, there is provided a method, the method comprising:
  enabling a display of a default image corresponding to a core portion of a larger image, the larger image comprising a core portion and a peripheral portion, and said display of the default image occurring at the time of opening an application or file to display the core image; and
  in response to a user input during the display of the core portion, revealing at least a part of the peripheral portion.

According to a further aspect, there is provided a computer program comprising computer program code, the computer program code being configured to perform at least the following:
  enable a display of a default image corresponding to a core portion of a larger image, the larger image comprising a core portion and a peripheral portion, and said display of the default image occurring at the time of opening an application or file to display the core image; and in response to a user input during the display of the core portion, reveal at least a part of the peripheral portion.

According to a further aspect, there is provided an apparatus comprising:
at least one processor; and
at least one memory including computer program code,
the at least one memory and the computer program code configured, with the at least one processor, to cause the apparatus to perform at least the following:
generate image data for a captured scene, the image data comprising respectively demarked core image data and peripheral image data, wherein
the core image data corresponds to a portion of the captured scene, and
the peripheral image data corresponds to the portion of the captured scene around at least part of the perimeter of the portion of the captured scene represented by the core image data.

According to a further aspect, there is provided a method, the method comprising:
generating image data for a captured scene, the image data comprising respectively demarked core image data and peripheral image data, wherein
the core image data corresponds to a portion of the captured scene, and
the peripheral image data corresponds to the portion of the captured scene around at least part of the perimeter of the portion of the captured scene represented by the core image data.

According to a further aspect, there is provided a computer program comprising computer program code, the computer program code being configured to perform at least the following:
generate image data for a captured scene, the image data comprising respectively demarked core image data and peripheral image data, wherein
the core image data corresponds to a portion of the captured scene, and
the peripheral image data corresponds to a portion of the captured scene around at least part of the perimeter of the portion of the captured scene represented by the core image data.

According to a further aspect, there is provided a data structure, the data structure comprising:
image data for a captured scene, the image data comprising respectively demarked core image data and peripheral image data, wherein
the core image data corresponds to the portion of the captured scene, and
the peripheral image data corresponds to the portion of the captured scene around at least part of the perimeter of the portion of the captured scene represented by the core image data.

According to a further aspect, there is provided an apparatus comprising:
at least one processor; and
at least one memory including computer program code,
the at least one memory and the computer program code configured to, with the at least one processor, cause the apparatus to perform at least the following:
enable display output of an image for a captured scene, using image data, the image data comprising respectively demarked core image data and peripheral image data, wherein
the core image data corresponds to the portion of the captured scene displayed within an image capture viewfinder when the image was captured, and
the peripheral image data corresponds to the portion of the captured scene around at least part of the perimeter of the portion of the captured scene represented by the core image data, the perimeter portion not displayed within the image capture viewfinder when the image was captured.

The apparatus may be configured to enable use of the respectively demarked core image data to enable the display output, in a default setting, of an image for only the core image data without the image of the peripheral image data.

The apparatus may be configured to enable, in response to a user input, use of the respectively demarked core image data and peripheral image data to subsequently display output an image using at least a portion of the peripheral image data.

The user input may be one or more of:
zoom out input; and
scrolling input.

The apparatus may be configured to display output the image using at least a portion of the peripheral image data for the peripheral image data indicated by a particular directional scrolling input.

The apparatus may comprise a display to enable the display output to a user.

The apparatus may be a portable electronic device, a laptop computer, a mobile phone, a Smartphone, a tablet computer, a personal digital assistant, a digital camera, a watch, a server, a non-portable electronic device, a desktop computer, a monitor, a server, a wand, a pointing stick, a touchpad, a touch-screen, a mouse, a joystick or a module/circuitry for one or more of the same.

According to a further aspect, there is provided an apparatus comprising:
at least one processor; and
at least one memory including computer program code,
the at least one memory and the computer program code configured, with the at least one processor, to cause the apparatus to perform at least the following:
generate image data for a captured scene, the image data comprising respectively demarked core image data and peripheral image data, wherein
the core image data corresponds to the portion of the captured scene displayed within an image capture viewfinder when the image was captured, and
the peripheral image data corresponds to the portion of the captured scene around at least part of the perimeter of the portion of the captured scene represented by the core image data, the perimeter portion not displayed within the image capture viewfinder when the image was captured.

According to a further aspect, there is provided a method, the method comprising:
enabling display output of an image for a captured scene, using image data, the image data comprising respectively demarked core image data and peripheral image data, wherein
the core image data corresponds to the portion of the captured scene displayed within an image capture viewfinder when the image was captured, and
the peripheral image data corresponds to the portion of the captured scene around at least part of the perimeter of the portion of the captured scene represented by the core image data, the perimeter portion not displayed within the image capture viewfinder when the image was captured According to a further aspect, there is provided a computer program comprising computer program code, the computer program code being configured to perform at least the following:

enable display output of an image for a captured scene, using image data, the image data comprising respectively demarked core image data and peripheral image data, wherein the core image data corresponds to the portion of the captured scene displayed within an image capture viewfinder when the image was captured, and the peripheral image data corresponds to the portion of the captured scene around at least part of the perimeter of the portion of the captured scene represented by the core image data, the perimeter portion not displayed within the image capture viewfinder when the image was captured.

The apparatus may be configured to enable use of the respectively demarked core image data to enable the display output, in a default setting, of an image for only the core image data without the image of the peripheral image data.

The core image data may comprise the central portion of the captured scene.

The viewfinder may be an electronic viewfinder, or an optical viewfinder.

The steps of any method disclosed herein do not have to be performed in the exact order disclosed, unless explicitly stated or understood by the skilled person.

Corresponding computer programs and data structures/signalling (which may or may not be recorded on a carrier, such as a CD or other non-transitory medium) for implementing one or more of the methods disclosed herein are also within the present disclosure and encompassed by one or more of the described example embodiments.

The present disclosure includes one or more corresponding aspects, embodiments or features in isolation or in various combinations whether or not specifically stated (including claimed) in that combination or in isolation. Corresponding means and corresponding function units (e.g. an enabler, a generator, a displayer) for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

FIGS. 7a-7b illustrate an example apparatus according to the present disclosure in communication with a remote server/cloud;

FIG. 8 shows the main steps of a method of enabling selection of a user interface element; and FIG. 9 a computer-readable medium comprising a computer program.

DESCRIPTION OF SPECIFIC ASPECTS/EMBODIMENTS

Figure 1:
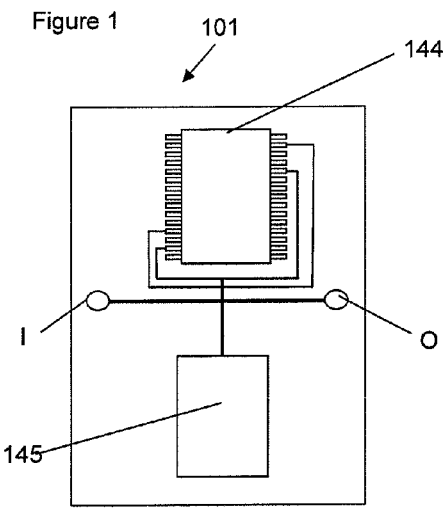
FIG. 1 depicts an example apparatus embodiment according to the present disclosure comprising a number of electronic components, including memory and a processor.

It is common for a user to use electronic devices to generate, store or otherwise interact with image data. For example, a user may use a digital camera, tablet, smartphone or camera phone to generate image data; and a smartphone, tablet or computer to store and edit the generated images.

Generally, important aspects of the image are located towards the centre. For example, when composing a photo of a person, it is common to locate the subject (for example, a person) towards the centre of the photo. Nevertheless, the periphery of the photo may change the overall impression of the photo and may have relevant details of interest.

The present disclosure relates to enabling a display of a default image corresponding to a core portion of a larger image, the larger image comprising a core portion and a peripheral portion, and said display of the default image occurring at the time of opening an application or file to display the core image; and in response to a user input during the display of the core portion, revealing at least a part of the peripheral portion.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

FIG. 1 shows an apparatus 101 comprising memory 145, a processor 144, input I and output O. In this embodiment only one processor and one memory are shown but it will be appreciated that other embodiments may utilise more than one processor and/or more than one memory (e.g. same or different processor/memory types).

In this embodiment the apparatus 101 is an Application Specific Integrated Circuit (ASIC) for a portable electronic device. In other embodiments the apparatus 101 can be a module for such a device, or may be the device itself, wherein the processor 144 is a general purpose CPU of the device and the memory 145 is general purpose memory comprised by the device.

The input I allows for receipt of signalling to the apparatus 101 from further components (e.g. from a receiver), such as components of a portable electronic device (like a touch-sensitive display) or the like. The output O allows for onward provision of signalling from within the apparatus 101 to further components. In this embodiment the input I and output O are part of a connection bus that allows for connection of the apparatus 101 to further components (e.g. to a transmitter or a display).

The processor 144 is a general purpose processor dedicated to executing/processing information received via the input I in accordance with instructions stored in the form of computer program code on the memory 145. The output signalling generated by such operations from the processor 144 is provided onwards to further components via the output O.

The memory 145 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 144, when the program code is run on the processor 144. The internal connections between the memory 145 and the processor 144 can be understood to provide, in one or more example embodiments, an active coupling between the processor 144 and the memory 145 to allow the processor 144 to access the computer program code stored on the memory 145.

In this example the input I, output O, processor 144 and memory 145 are all electrically connected to one another internally to allow for electrical communication between the respective components I, O, 144, 145. In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
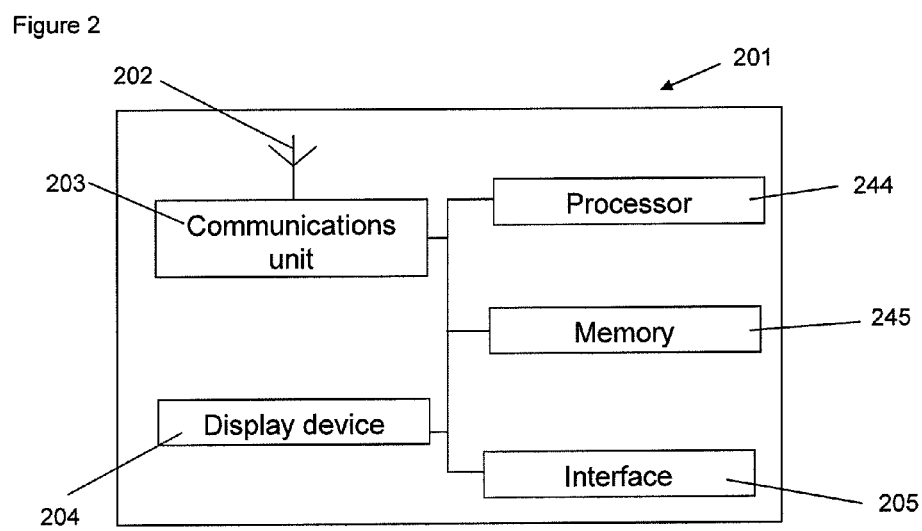
FIG. 2 depicts an example apparatus embodiment according to the present disclosure comprising a number of electronic components, including memory, a processor and a communication unit.

FIG. 2 depicts an apparatus 201 of a further example embodiment, such as a mobile phone. In other example embodiments, the apparatus 201 may comprise a module for a mobile phone (or PDA or audio/video player), and may just comprise a suitably configured memory 245 and processor 244. The apparatus in certain embodiments could be a portable electronic device, a laptop computer, a mobile phone, a Smartphone, a tablet computer, a personal digital assistant, a digital camera, a watch, a server, a non-portable electronic device, a desktop computer, a monitor, a server, a wand, a pointing stick, a touchpad, a touch-screen, a mouse, a joystick or a module/circuitry for one or more of the same.

The example embodiment of FIG. 2, in this case, comprises a display device 204 such as, for example, a Liquid Crystal Display (LCD) or touch-screen user interface. The apparatus 201 of FIG. 2 is configured such that it may receive, include, and/or otherwise access data. For example, this example embodiment 201 comprises a communications unit 203, such as a receiver, transmitter, and/or transceiver, in communication with an antenna 202 for connecting to a wireless network and/or a port (not shown) for accepting a physical connection to a network, such that data may be received via one or more types of networks. This example embodiment comprises a memory 245 that stores data, possibly after being received via antenna 202 or port or after being generated at the user interface 205. The processor 244 may receive data from the user interface 205, from the memory 245, or from the communication unit 203. It will be appreciated that, in certain example embodiments, the display device 204 may incorporate the user interface 205. Regardless of the origin of the data, these data may be outputted to a user of apparatus 201 via the display device 204, and/or any other output devices provided with apparatus. The processor 244 may also store the data for later use in the memory 245. The memory 245 may store computer program code and/or applications which may be used to instruct/enable the processor 244 to perform functions (e.g. read, write, delete, edit or process data).

Figure 3:
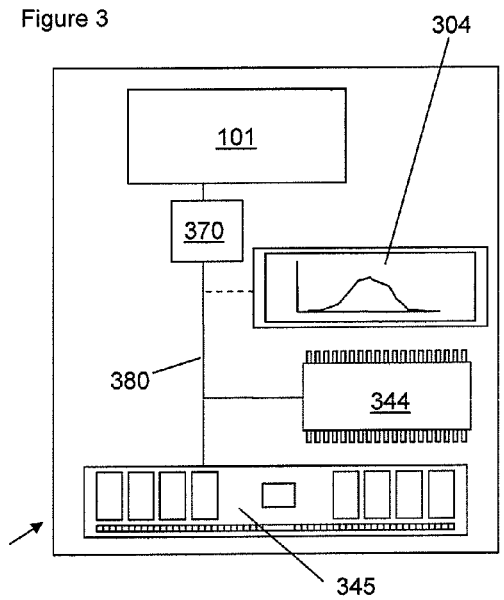
FIG. 3 depicts an example apparatus embodiment according to the present disclosure comprising a number of electronic components, including memory, a processor and a communication unit.

FIG. 3 depicts a further example embodiment of an electronic device 301, such as a tablet personal computer, a portable electronic device, a portable telecommunications device, a server or a module for such a device, the device comprising the apparatus 101 of FIG. 1. The apparatus 101 can be provided as a module for device 301, or even as a processor/memory for the device 301 or a processor/memory for a module for such a device 301. The device 301 comprises a processor 344 and a storage medium 345, which are connected (e.g. electrically and/or wirelessly) by a data bus 380. This data bus 380 can provide an active coupling between the processor 344 and the storage medium 345 to allow the processor 344 to access the computer program code. It will be appreciated that the components (e.g. memory, processor) of the device/apparatus may be linked via cloud computing architecture. For example, the storage device may be a remote server accessed via the internet by the processor.

The apparatus 101 in FIG. 3 is connected (e.g. electrically and/or wirelessly) to an input/output interface 370 that receives the output from the apparatus 101 and transmits this to the device 301 via data bus 380. Interface 370 can be connected via the data bus 380 to a display 304 (touch-sensitive or otherwise) that provides information from the apparatus 101 to a user. Display 304 can be part of the device 301 or can be separate. The device 301 also comprises a processor 344 configured for general control of the apparatus 101 as well as the device 301 by providing signalling to, and receiving signalling from, other device components to manage their operation.

The storage medium 345 is configured to store computer code configured to perform, control or enable the operation of the apparatus 101. The storage medium 345 may be configured to store settings for the other device components. The processor 344 may access the storage medium 345 to retrieve the component settings in order to manage the operation of the other device components. The storage medium 345 may be a temporary storage medium such as a volatile random access memory. The storage medium 345 may also be a permanent storage medium such as a hard disk drive, a flash memory, a remote server (such as cloud storage) or a non-volatile random access memory. The storage medium 345 could be composed of different combinations of the same or different memory types.

Figure 4A:
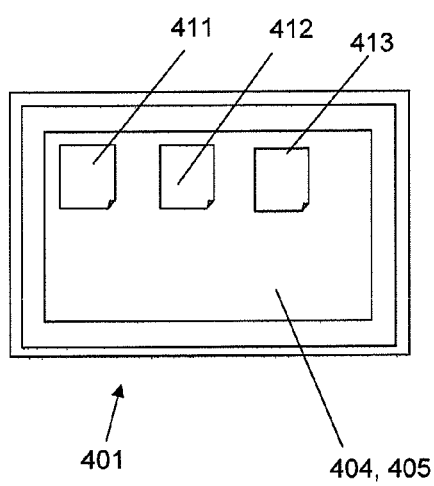
FIGS. 4a-c show an example embodiment configured to enable image editing.
Figure 4B:
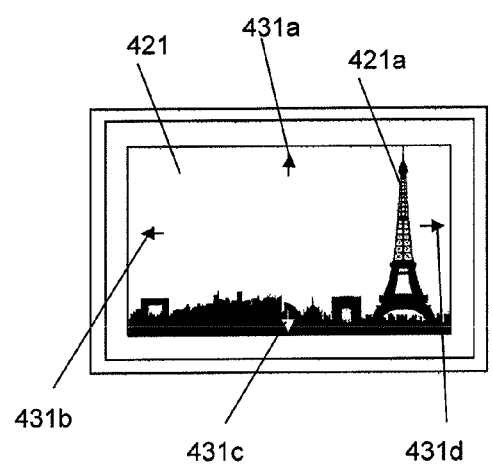
Figure 4C:
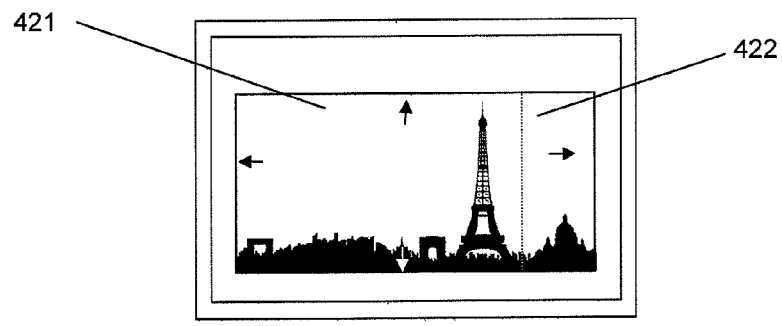

FIG. 4*a-c* shows an embodiment of a tablet computer electronic device 401 comprising a touch screen 404, 505. In this case, the user is using the electronic device to store and edit stored images.

In the situation shown in FIG. 4*a*, the electronic device is displaying a number of files 411, 412, 413, each file 411, 412, 413 containing data corresponding to an image. In this example, the images are digital photographic images. The user then selects one of the image data files 411 to open the image using an image editing/viewing application.

In this case, at the time of opening an application or file to display the image, the electronic device is configured to enable a display of a default image corresponding to a core portion of a larger image (the larger image corresponding, in this case, to the entire data of the image data file 411), the larger image comprising a core portion and a peripheral portion. In this case, the electronic device is configured, when the image data file is selected for opening, to demark data corresponding to the core image from data corresponding to the peripheral image. For example, in this case, the apparatus may be configured to demark, by default, the central 90% (along one or more axes) of the data corresponding to the larger image as the core portion, and the remaining portion as the peripheral portion. It will be appreciated that the default settings may be predefined (e.g. by the user and/or the apparatus/electronic device).

It will be appreciated that, in this case, the apparatus is configured to open only a portion of the selected data file 411 in the default setting. It will be appreciated that this may allow the user to determine what the image relates to without opening the entire image. This may reduce the amount of active memory required without reducing the resolution of the opened image.

FIG. 4*b* shows the image editing/viewing application displaying the opened core image 421. In this case, the image corresponds to a photograph of the skyline of Paris. When the core image is displayed, the electronic device/apparatus is configured to display a number of user interface elements 431*a*-431*d* which the user can control to edit the photograph. In this case, the user interface elements 431*a*-431*d* comprise a number of arrow controls which can be used to extend the image.

In this case, the user considers that the image may create a better overall impression if the Eiffel tower 421*a* were located more centrally along the left right axis. To achieve this, a user provides input to select the right arrow user interface element 431*d*.

The result of the user selecting the right arrow user interface element 431*d* is shown in FIG. 4*c*. In response to this user input during the display of the core portion, the apparatus/electronic device is configured to reveal at least a part of the peripheral portion 422 of the larger image. In this case, the apparatus/device is configured to open data corresponding to the peripheral portion in response to the user input.

As shown in FIG. 4*c*, the core image is delineated from the added part of the peripheral portion by a dotted line. It will be appreciated that other embodiments may be configured not to display this delineation to the user. As shown in FIG. 4*c*, when the additional part of the peripheral portion is appended to the core portion, the Eiffel tower is located more centrally. It will be appreciated that the user input 431*d* does not, in this case, pan/scroll the image by increases the overall size of the image to include the peripheral portion. In other embodiments, it may pan/scroll in particular directions without increasing the overall size of the displayed image.

Figure 5A:
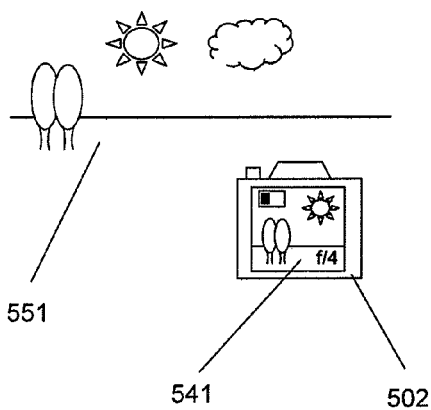
FIGS. 5a-d depict further example embodiments configured to generate and process image data.

FIG. 5*a* depicts an embodiment of an electronic device 502 such as a digital camera (or smartphone) being used to capture a scene 551.

In this example, the user has composed the scene 551 using a digital viewfinder 541 such that the digital viewfinder displays an image of the two trees and the sun. The user is happy with the composition and so takes the photo to capture an image of the scene 551. In this case, the viewfinder is also configured to display camera data superimposed on the image of the scene (e.g. including battery remaining and camera settings). In this case, these camera data are not stored as part of the captured scene.

In response to the user taking the photographic image, the camera electronic device is configured to generate image data for the captured scene, the image data comprising respectively demarked core image data and peripheral image data, wherein the core image data corresponds to the portion of the captured scene 551, and the peripheral image data corresponds to the portion of the captured scene around at least part of the perimeter of the portion of the captured scene represented by the core image data. This image data is then transferred to an external electronic device embodiment 501, such as a mobile phone.

Figure 5B:
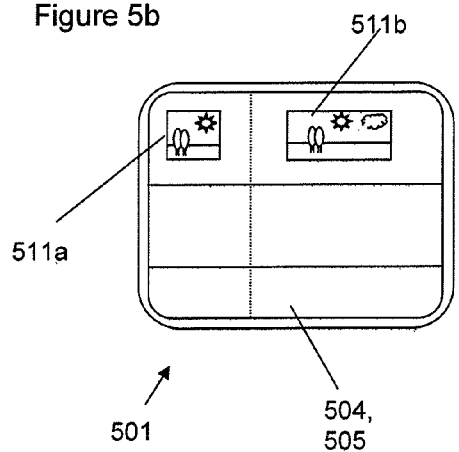

FIG. 5*b* shows the user viewing the stored image data 511*a*, 511*b* on the mobile phone electronic device 501. In particular, the data generated by the camera forms a data structure comprising two image files: a first image file 511*a* of core image data which corresponds to the portion of the captured scene displayed within an image capture viewfinder when the image was captured; and a second image file 511*b* comprising core image data and peripheral image data, the peripheral image data corresponding to a portion of the captured scene around at least part of the perimeter of the portion of the captured scene represented by the core image data. In this way, the core image data is demarked from the peripheral image data by being stored in a separate file from the peripheral image data to allow for subsequent recombination in to the image data by using respective demarking. In certain cases, the peripheral image data may be stored without being part of the core image data but just demarked for appropriate recombination.

In this case, both image files 511*a*, 511*b* are visible and selectable to the user. It will be appreciated that other embodiments may be configured such that only the image file corresponding to the core image data is visible to, and/or selectable by, the user. It will be appreciated that the two image files may or may not be in the same format. For example, the core image data file may be in a JPEG format and the larger image data file may be in a RAW format, or both may be in a JPEG format.

It will be appreciated that, in other embodiments, the image data corresponding to the larger image may be stored in a single file, wherein the core image data is demarked from the peripheral image data by one or more respective flags configured to denote at least one of: the core image data as core image data; and peripheral image data as peripheral image data. For example, the larger image file may comprise a header denoting the outer 15% of the image as peripheral image data. In other embodiments, each pixel may have an associated flag denoting whether the pixel is core image data or peripheral image data.

In this case, the user wishes to open the image which he captured. To do this, the user selects the core image data file 511*a*. In response to selecting the core image data file 511*a*, the phone electronic device is configured to open the core image data file 511*a* using an image editing/viewing application (which may or may not be the same application which allowed the viewing as per FIG. 5*b*).

Figure 5C:
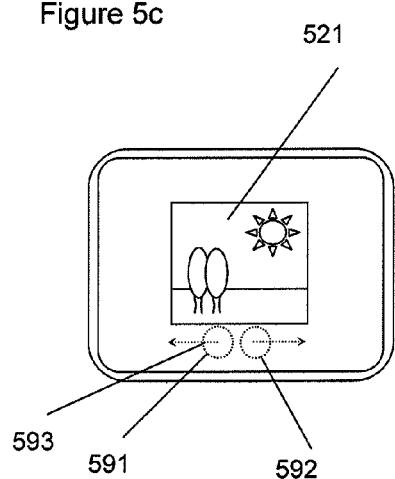

In this case, as shown in FIG. 5*c*, the apparatus/device is configured to enable the display of the default image corresponding to a core portion 521 of the larger image, the larger image comprising a core portion and a peripheral portion, and said display of the default image occurring at the time of opening an application or file to display the core image.

In this case, the user remembers that there was a cloud when he took the photographic image and considers that the photographic image would be improved by including the cloud (even though the cloud was not included on the viewfinder 541 when the photo was composed and captured). To include the cloud the user provides a multitouch spreading gesture 593 on the surface of the touch screen (in this case, by placing a finger 592 and thumb 591 on the screen together and, whilst maintaining contact with the screen, moving his finger and thumb apart). This serves to zoom out the image in the axis of the spreading gesture. That is, the multitouch spreading gesture is a zooming out input 593.

Figure 5D:
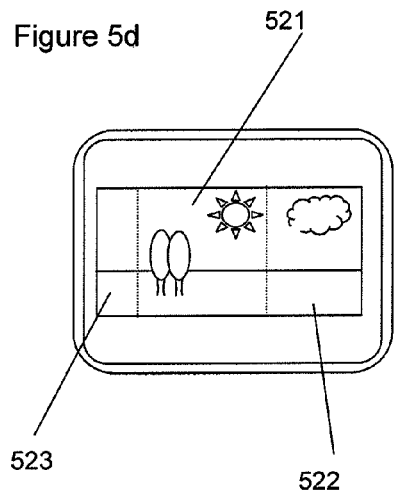

As shown in FIG. 5*d*, in response to the multitouch spreading gesture user input 593 during the display of the core portion 521, the apparatus/device is configured to reveal at least a part of the peripheral portion 522, 523. In this case, the apparatus is configured to retrieve data from the larger image data file 511*b* corresponding to the peripheral data and add the corresponding part of the peripheral image to the perimeter of the displayed core portion.

Figure 6A:
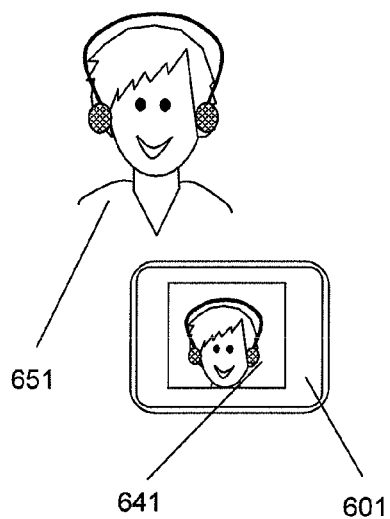
FIGS. 6a-6d depict further example embodiments configured to generate and process image data.

FIG. 6a depicts a further embodiment such as a smartphone being used to capture a photograph of a scene. In this case, the scene is a person listening to headphones.

In this example, the user has composed the scene using an electronic viewfinder 641 such that the digital viewfinder 641 displays an image of the subject's face. The user is happy with the composition and so takes the photo to capture the scene 651. In response to the user taking the photographic image, the smartphone electronic device is configured to generate image data for the captured scene, the image data comprising respectively demarked core image data and peripheral image data, wherein the core image data corresponds to the portion of the captured scene, and the peripheral image data corresponds to the portion of the captured scene around at least part of the perimeter of the portion of the captured scene represented by the core image data. This image data is then stored on the smartphone. It will be appreciated that the smartphone may be configured to transmit the image data to a remote device for storage (e.g. to a computer or another mobile phone).

Figure 6B:
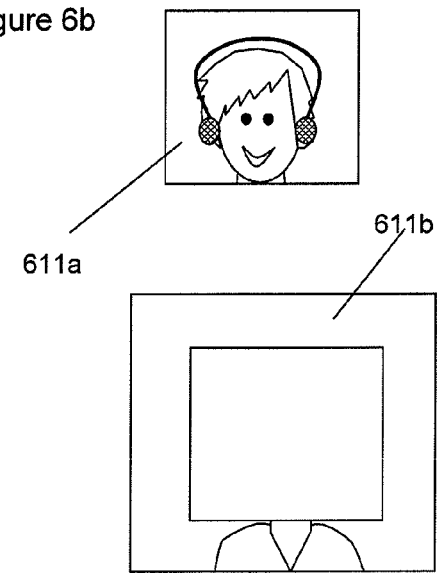

FIG. 6b is a representation of the data structure of the stored image data on the mobile phone electronic device. In particular, the data generated by the smartphone forms two image files: a first image file 611a of core image data which corresponds to the portion of the captured scene displayed within an image capture viewfinder when the image was captured; and a second image file 611b of peripheral image data, the peripheral image data corresponding to a portion of the captured scene around at least part of the perimeter of the portion of the captured scene represented by the core image data. In this way, the core image data 611a is demarked from the peripheral image data 611b by being stored in a separate file from the peripheral image data to allow for subsequent recombination in to the image data by using respective demarking.

Unlike the previous embodiment, in this case, only the image file corresponding to the core image data is visible for selection to the user.

In this case, the user wishes to open the image which he captured. To do this, the user selects the core image data file (which is visible for selection). In response to selecting the core image data file 611a, the smartphone electronic device is configured to open the core image data file using an image editing/viewing application.

Figure 6C:
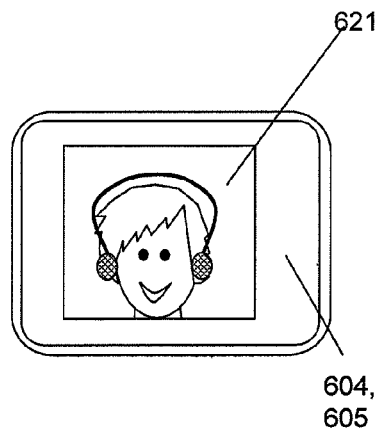

In this case, as shown in FIG. 6c, the apparatus/device is configured to enable the display of the default image corresponding to a core portion 621 of the larger image, the larger image comprising a core portion and a peripheral portion, and said display of the default image occurring at the time of opening an application or file to display the core image.

In this case, the user notices that there was that the users face is too close to the bottom of the photographic image. To include more of the captured scene around the users face the user provides a zooming out input (e.g. by pressing a zoom out key).

Figure 6D:
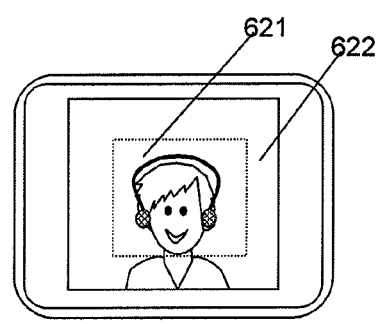

In response to the zooming out input during the display of the core portion 621, the apparatus/device is configured to reveal at least a part of the peripheral portion 622 (as shown in FIG. 6d). In this case, the apparatus is configured to retrieve data from the peripheral image data file corresponding to the peripheral data and add the corresponding image to the perimeter of the displayed core portion. This is shown in FIG. 6d.

When taking a photo, a user generally tries to compose the photograph in the best way. However, when reviewing the photograph later, they may consider that the photograph would have been better if additional details had been included. Although conventional digital cameras allow portions of the image to be removed, they do not allow a portion of the image to be added. Allowing at least a part of a peripheral portion to be added after the image has been captured enables the user to compose the scene as he thinks best at the time of capturing the scene whilst not precluding adding an image portion to that scene at a later time.

FIG. 7a shows that an example embodiment of an apparatus in communication with a remote server. FIG. 7b shows that an example embodiment of an apparatus in communication with a "cloud" for cloud computing. In FIGS. 7a and 7b, apparatus 701 (which may be apparatus 101, 201 or 301) is in communication with a display 704. Of course, the apparatus 701 and display 704 may form part of the same apparatus/device, although they may be separate as shown in the figures. The apparatus 701 is also in communication with a remote computing element. Such communication may be via a communications unit, for example. FIG. 6a shows the remote computing element to be a remote server 795, with which the apparatus may be in wired or wireless communication (e.g. via the internet, Bluetooth, a USB connection, or any other suitable connection as known to one skilled in the art).

In FIG. 7b, the apparatus 701 is in communication with a remote cloud 796 (which may be, for example, by the Internet, or a system of remote computers configured for cloud computing). It may be that the image data, at least some files and/or at least some applications are stored/run at the remote computing element 795, 796 and accessed by the apparatus 701 for display 704. The user applications need not all be stored at the same location. Some or all of the user applications and/or user content may be stored at the apparatus 101, 201, 301. The apparatus 701 may actually form part of the remote sever 795 or remote cloud 796. In such embodiments, the enablement of image display and/or image generation may be conducted by the server or in conjunction with use of the server/cloud.

FIG. 8 illustrates the process flow according to an example embodiment of the present disclosure. The process comprises enabling 881 enabling a display of a default image corresponding to a core portion of a larger image, the larger image comprising a core portion and a peripheral portion, and said display of the default image occurring at the time of opening an application or file to display the core image; and in response to a user input during the display of the core portion, revealing 882 at least a part of the peripheral portion.

FIG. 9 illustrates schematically a computer/processor readable medium 900 providing a computer program according to one embodiment. In this example, the computer/processor readable medium 800 is a disc such as a digital versatile disc (DVD or a compact disc (CD. In other embodiments, the computer/processor readable medium 800 may be any medium that has been programmed in such a way as to carry out an inventive function. The computer/processor readable medium 900 may be a removable memory device such as a memory stick or memory card (SD, mini SD or micro SD.

The computer program may comprise computer code configured to perform, control or enable one or more of the method steps 881, 881 of FIG. 8. In this respect, the computer program may be stored on the storage medium of the scanning/initiating device, the storage medium of the advertising device or the storage media of both devices.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state and only load the appropriate software in the enabled (e.g. on state. The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded recorded on an appropriate carrier (e.g. memory, signal.

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc, these may comprise a computer processor, Application Specific Integrated Circuit (ASIC, field-programmable gate array (FPGA, and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code,
   the at least one memory and the computer program code configured, with the at least one processor, to cause the apparatus to perform at least the following:
   enable a display of a default image corresponding to only a core portion of a larger image, the larger image comprising a core image portion and a peripheral image portion, and said display of the default image occurring at the time of opening an application or file to display only the core image portion, wherein data corresponding to the core image portion is demarked based at least in part on one or more axis from data corresponding to the peripheral image portion to enable the display of said default image, wherein demarked core image data corresponds to a portion of a captured scene displayed within an image capture viewfinder when the larger image was captured while demarked peripheral portion data corresponds to a portion of the captured scene that is not displayed within the image capture viewfinder when the larger image was captured, wherein the demarked core image data and demarked peripheral portion data are stored in two separate files to allow for subsequent recombination of image data using respective demarked data;
   receive a user input to extend the core portion along the one or more axis, wherein the user input is configured to extend the core portion to comprise at least one object that was not included in the core portion when the larger image was composed or captured; and
   in response to the user input during the display of the core portion, reveal at least a part of the peripheral portion.

2. The apparatus of claim 1, wherein the user input comprises at least one of:
   zoom out input; and
   scroll input.

3. The apparatus of claim 1, wherein the larger image is between 5% to 20% larger in at least one dimension than the core image.

4. The apparatus of claim 1, wherein the core image data is demarked from the peripheral image data by one or more respective flags configured to denote at least one of: the core image data as core image data; and peripheral image data as peripheral image data.

5. The apparatus of claim 1, wherein one or more of the core image data and peripheral image data are respectively demarked to allow the core image data to be stored in a separate file from the peripheral image data to allow for subsequent recombination into the image data by using the respective demarking.

6. The apparatus of claim 1, wherein the demarcation is performed by the application at the time of opening an application or file to display the core image.

7. The apparatus of claim 1, wherein the larger image corresponds to a captured scene.

8. The apparatus of claim 7, wherein
   the core image corresponds to a portion of the captured scene, the portion being displayed within an image capture viewfinder when the image was captured.

9. The apparatus of claim 7, wherein
   the peripheral image corresponds to a portion of the captured scene around at least part of the perimeter of the portion of the captured scene represented by the core image data.

10. The apparatus of claim 1 wherein the apparatus comprises a display to display the images to a user.

11. The apparatus of claim 1, wherein the apparatus is a portable electronic device, a laptop computer, a mobile phone, a Smartphone, a tablet computer, a personal digital assistant, a digital camera, a watch, a server, a non-portable electronic device, a desktop computer, a monitor, a server, a wand, a pointing stick, a touchpad, a touch-screen, a mouse, a joystick or a module/circuitry for one or more of the same.

12. A method, the method comprising:
   enabling, by a processor, a display of a default image corresponding to only a core portion of a larger image, the larger image comprising a core image portion and a peripheral image portion, and said display of the default image occurring at the time of opening an application or file to display only the core image portion, wherein data corresponding to the core portion is demarked based at least in part on one or more axis from data corresponding to the peripheral portion to enable the display of said default image, wherein demarked core image data corresponds to a portion of a captured scene displayed within an image capture viewfinder when the larger image was captured while demarked peripheral portion data corresponds to a portion of the captured scene that is not displayed within the image capture viewfinder when the larger image was captured, wherein the demarked core image data and demarked peripheral portion data are stored in two separate files to allow for subsequent recombination of image data using respective demarked data;
   receiving, by the processor, a user input to extend the core portion along the one or more axis, wherein the user input is configured to extend the core portion to comprise at least one object that was not included in the core portion when the larger image was composed or captured; and
   in response to the user input during the display of the core portion, revealing, by the processor, at least a part of the peripheral portion.

13. A non-transitory medium comprising a computer program comprising computer program code, the computer program code being configured to perform at least the following:
   enable a display of a default image corresponding to only a core portion of a larger image, the larger image comprising a core image portion and a peripheral image portion, and said display of the default image occurring at the time of opening an application or file to display only the core image portion, wherein data corresponding to the core portion is demarked based at least in part on one or more axis from data corresponding to the peripheral portion to enable the display of said default image, wherein demarked core image data corresponds to a portion of a captured scene displayed within an image capture viewfinder when the larger image was captured while demarked peripheral portion data corresponds to a portion of the captured scene that is not displayed within the image capture viewfinder when the larger image was captured, wherein the demarked core image data and demarked peripheral portion data are stored in two separate files to allow for subsequent recombination of image data using respective demarked data;
   receive a user input to extend the core portion along the one or more axis, wherein the user input is configured to extend the core portion to comprise at least one object that was not included in the core portion when the larger image was composed or captured; and
   in response to a user input during the display of the core portion, reveal at least a part of the peripheral portion.

14. An apparatus comprising:
   at least one processor; and
   at least one memory including computer program code,
   the at least one memory and the computer program code configured, with the at least one processor, to cause the apparatus to perform at least the following:
   generate image data for a captured scene, the image data comprising respectively demarked core image data and peripheral image data, wherein
   the core image data corresponds to the portion of the captured scene displayed within an image capture viewfinder when the scene was captured, and
   the peripheral image data corresponds to the portion of the captured scene around at least part of the perimeter of the portion of the captured scene represented by the core image data, wherein demarked peripheral image data corresponds to the portion of the captured scene that is not displayed within the image capture viewfinder when the scene was captured such that the demarked peripheral image data comprises at least one object that was not included in the core image data when the scene was composed or captured, wherein the demarked core image data and demarked peripheral portion data are stored in two separate files to allow for subsequent recombination of image data using respective demarked data, and
   subsequently cause display, in a default setting, of an image for only the core image data without the image of the peripheral image data at the time of opening an application or a file containing the image data by providing the demarcation of the image data based on at least in part on one or more axis.

15. A method, the method comprising:

generating, by a processor, image data for a captured scene, the image data comprising respectively demarked core image data and peripheral image data, wherein the core image data corresponds to the portion of the captured scene displayed within an image capture viewfinder when the scene was captured, and the peripheral image data corresponds to the portion of the captured scene around at least part of the perimeter of the portion of the captured scene represented by the core image data, wherein the demarked peripheral image data corresponds to the portion of the captured scene that is not displayed within the image capture viewfinder when the scene was captured such that the demarked peripheral image data comprises at least one object that was not included in the core image data when the scene was composed or captured, wherein the demarked core image data and demarked peripheral portion data are stored in two separate files to allow for subsequent recombination of image data using respective demarked data, and subsequently causing, by the processor, display, in a default setting, of an image for only the core image data without the image of the peripheral image data at the time of opening an application or a file containing the image data by providing the demarcation of the image data based on at least in part on one or more axis.

16. A non-transitory computer readable medium comprising computer program code, the computer program code being configured to perform at least the following:

generate image data for a captured scene, the image data comprising respectively demarked core image data and peripheral image data, wherein the core image data corresponds to the portion of the captured scene displayed within an image capture viewfinder when the scene was captured, and the peripheral image data corresponds to the portion of the captured scene around at least part of the perimeter of the portion of the captured scene represented by the core image data, wherein the demarked peripheral image data corresponds to the portion of the captured scene that is not displayed within the image capture viewfinder when the scene was captured such that the demarked peripheral image data comprises at least one object that was not included in the core image data when the scene was composed or captured, wherein the demarked core image data and demarked peripheral portion data are stored in two separate files to allow for subsequent recombination of image data using respective demarked data, and subsequently cause display, in a default setting, of an image for only the core image data without the image of the peripheral image data at the time of opening an application or a file containing the image data by providing the demarcation of the image data based on at least in part on one or more axis.

* * * * *